US009789530B2

(12) United States Patent
Alber et al.

(10) Patent No.: US 9,789,530 B2
(45) Date of Patent: Oct. 17, 2017

(54) METHOD AND APPARATUS FOR PRODUCING TAILORED SHEET-METAL STRIPS

(71) Applicant: WISCO LASERTECHNIK GMBH, Ravensburg (DE)

(72) Inventors: Gerhard Alber, Berg (DE); Martin Retzbach, Ravensburg (DE)

(73) Assignee: Wisco Lasertechnik GmbH, Ravensburg (DE)

( * ) Notice: Subject to any disclaimer, the term of this patent is extended or adjusted under 35 U.S.C. 154(b) by 342 days.

(21) Appl. No.: 14/152,099

(22) Filed: Jan. 10, 2014

(65) Prior Publication Data

US 2014/0123720 A1    May 8, 2014

Related U.S. Application Data

(63) Continuation of application No. PCT/EP2012/062466, filed on Jun. 27, 2012.

(30) Foreign Application Priority Data

Jul. 11, 2011    (DE) .................... 10 2011 051 728

(51) Int. Cl.
*B21D 39/03* (2006.01)
*B23K 26/08* (2014.01)
(Continued)

(52) U.S. Cl.
CPC ........... *B21D 39/03* (2013.01); *B21D 13/045* (2013.01); *B21D 43/287* (2013.01);
(Continued)

(58) Field of Classification Search
CPC .... B21D 39/03; B21D 35/006; B21D 35/007; B21D 13/04; B21D 13/045;
(Continued)

(56) References Cited

U.S. PATENT DOCUMENTS 3,245,141 A * 4/1966 Gruetjen ............ B23K 35/406
                                                  29/33 E
4,718,476 A * 1/1988 Eibe ...................... B22D 11/10
                                                  164/476
(Continued)

FOREIGN PATENT DOCUMENTS

CN         1163813 A1   11/1997
CN       201537814 U     8/2010
(Continued)

OTHER PUBLICATIONS

German Office Action (Application No. 102011051728.6) dated Jun. 5, 2012.
(Continued)

*Primary Examiner* — David Bryant
*Assistant Examiner* — Lawrence Averick
(74) *Attorney, Agent, or Firm* — Burr & Brown, PLLC (57) ABSTRACT

The invention relates to a method for producing tailored sheet-metal strips, in which at least one sheet-metal strip having a substantially planar surface is integrally connected along its longitudinal edge to at least one further web-shaped semifinished product made of metal, wherein the at least one further web-shaped semifinished product differs from the at least one sheet-metal strip in terms of at least one of its properties, and wherein the at least one sheet-metal strip and the at least one further web-shaped semifinished product are fed continuously to at least one joining station, characterized in that a web-shaped semifinished product having a three-dimensional structure, a hollow profile and/or a multiplicity of recesses and/or holes in succession along its longitudinal edge is used as the at least one further web-shaped semifinished product which is fed to the joining station. An apparatus for carrying out the method is furthermore claimed.

5 Claims, 5 Drawing Sheets

(51) Int. Cl.
*B21D 13/04* (2006.01)
*B23K 26/26* (2014.01)
*B23K 20/12* (2006.01)
*B23K 31/02* (2006.01)
*B21D 43/28* (2006.01)
*B23P 17/04* (2006.01)
*B23K 103/08* (2006.01)
*B23K 103/18* (2006.01)
*B23K 103/04* (2006.01)
*B23K 101/16* (2006.01)
*B23K 101/18* (2006.01)
*B23K 103/10* (2006.01)
*B23K 103/20* (2006.01)
*B23K 103/12* (2006.01)

(52) U.S. Cl.
CPC ........ *B23K 20/122* (2013.01); *B23K 26/0846* (2013.01); *B23K 26/26* (2013.01); *B23K 31/02* (2013.01); *B23P 17/04* (2013.01); B23K 2201/16 (2013.01); B23K 2201/185 (2013.01); B23K 2203/04 (2013.01); B23K 2203/10 (2013.01); B23K 2203/12 (2013.01); B23K 2203/15 (2015.10); B23K 2203/18 (2013.01); B23K 2203/20 (2013.01); Y10T 29/49805 (2015.01); Y10T 29/49826 (2015.01); Y10T 29/49885 (2015.01); Y10T 29/49888 (2015.01)

(58) Field of Classification Search
CPC .............. B21D 2205/02; B21D 43/287; B29D 39/031; B21B 15/007; B21B 2015/014; B21B 2015/0057; B21B 15/0085; Y10T 29/49885; Y10T 29/49908; Y10T 29/49968; Y10T 29/49805; Y10T 29/49888; B23K 11/02; B23K 11/04; B23K 13/015; B23K 31/022; B23K 20/12; B23K 20/122; B23K 20/1215; B23K 2203/20; B23K 2203/04; B23K 2203/18; B23K 2201/185; B23K 2201/16; B23K 31/02; B23K 13/045; B23K 26/26; B23K 26/0846; B23K 2203/10; B23P 17/04
USPC ..... 228/164–174, 18, 112.1, 2.1; 219/121.64
See application file for complete search history.

(56) References Cited

U.S. PATENT DOCUMENTS

| | | | | |
|---|---|---|---|---|
| 4,774,997 A | * | 10/1988 | Eibe | B22D 11/10 164/154.1 |
| 4,896,818 A | * | 1/1990 | Shteinbok | B21D 47/00 228/170 |
| 5,133,126 A | * | 7/1992 | Matsuoka | B21C 23/005 228/164 |
| 5,343,010 A | | 8/1994 | Urech | |
| 6,068,178 A | * | 5/2000 | Michisaka | B23K 20/126 228/112.1 |
| 6,581,819 B1 | | 6/2003 | Aota et al. | |
| 6,813,923 B2 | * | 11/2004 | Jones | B21D 11/10 72/16.2 |
| 8,782,898 B2 | * | 7/2014 | Heng | B21D 11/14 29/428 |
| 9,469,887 B2 | * | 10/2016 | Dring | B21C 23/002 |
| 2002/0043092 A1 | * | 4/2002 | Jones | B21D 11/10 72/342.1 |
| 2008/0313906 A1 | * | 12/2008 | Eisele | B21C 37/08 29/890.046 |
| 2009/0087679 A1 | * | 4/2009 | McCall | F16L 9/17 428/594 |
| 2011/0293959 A1 | * | 12/2011 | Heng | B21D 11/14 428/592 |
| 2011/0296891 A1 | * | 12/2011 | Lenkner | B21D 53/04 72/325 |
| 2012/0037148 A1 | * | 2/2012 | Tudor | F28D 20/02 126/400 |
| 2012/0040205 A1 | | 2/2012 | Lenze et al. | |
| 2012/0061453 A1 | * | 3/2012 | Vogt | B23K 26/0846 228/160 |
| 2012/0102857 A1 | * | 5/2012 | Savolainen | B23K 28/02 52/204.1 |
| 2013/0092279 A1 | * | 4/2013 | Daniel | B21C 37/065 138/157 |
| 2013/0193181 A1 | | 8/2013 | Plha et al. | |

FOREIGN PATENT DOCUMENTS

| | | | |
|---|---|---|---|
| DE | 1 288 548 B | 2/1969 | |
| DE | 33 43 709 A1 | 6/1984 | |
| DE | 3343709 * | 6/1984 | |
| DE | 43 28 515 A1 | 9/1994 | |
| DE | 10 2009 020 614 A1 | 12/2009 | |
| DE | 102008060467 A1 * | 6/2010 | ......... B23K 26/0846 |
| EP | 0 438 612 A1 | 7/1991 | |
| EP | 0 888 843 A1 | 1/1999 | |
| EP | 2 047 922 A1 | 4/2009 | |
| JP | 59-109466 A1 | 6/1984 | |
| WO | 2010/094538 A1 | 8/2010 | |

OTHER PUBLICATIONS

International Search Report and Written Opinion (Application No. PCT/EP2012/06466) dated Aug. 13, 2012.
Chinese Office Action and Search Report (Application No. 201280034415.X) dated Dec. 2, 2014 (with English translation).

* cited by examiner

METHOD AND APPARATUS FOR PRODUCING TAILORED SHEET-METAL STRIPS

CROSS REFERENCE TO RELATED APPLICATIONS

This application is a continuation of International Application No. PCT/EP2012/062466 filed Jun. 27, 2012, which designated the United States, and claims the benefit under 35 USC §119(a)-(d) of German Application No. 10 2011 051 728.6 filed Jul. 11, 2011, the entireties of which are incorporated herein by reference.

FIELD OF THE INVENTION

The invention relates to a method for producing tailored sheet-metal strips, in which at least one sheet-metal strip having a substantially planar surface is integrally connected along its longitudinal edge to at least one further web-shaped semifinished product made of metal, wherein the at least one further web-shaped semifinished product differs from the at least one sheet-metal strip in terms of at least one of its properties, and wherein the at least one sheet-metal strip and the at least one further web-shaped semifinished product are fed continuously to at least one joining station. Furthermore, the invention relates to an apparatus for producing tailored sheet-metal strips, comprising at least one joining station, at least one strip feeding device for feeding at least one sheet-metal strip into the joining station, and at least one further feeding device for feeding at least one further web-shaped semifinished product made of metal into the joining station, wherein the at least one sheet-metal strip is integrally joined along its longitudinal edge to the at least one further web-shaped semifinished product in the joining station.

BACKGROUND OF THE INVENTION

When components made of metal are used, in particular in motor vehicle construction, great value is set upon a low weight of the component with a design appropriate for the loading. This is usually achieved by the use of what are termed "tailored blanks". These are tailored sheet-metal plates composed of plate blanks of differing sheet-metal thickness, material quality and/or surface condition which are welded to one another. Tailored blanks make it possible to adapt various points of the later component to local stresses, which otherwise requires additional reinforcing parts. Advantages of tailored blanks are a reduction in weight and production costs. For economically producing components with a design appropriate for the loading, however, discontinuous processing of tailored plates is not always satisfactory. Therefore, tailored metal strips ("tailored strips") have been developed, which can be processed in progressive composite tools or from which components profiled by roll forming can be produced. Tailored strips are usually produced by continuously welding two or three sheet-metal strips of differing thickness, quality and/or surface condition to one another along their longitudinal edge. To this end, the individual sheet-metal strips (slit strips), which are supplied as coils, are flattened in straightening machines after the uncoiling process. This is followed by edge machining to prepare the sheet-metal edges to be welded to one another. Then, the sheet-metal strips are welded to one another in continuous operation in a laser welding station. After the joining process, the thus produced tailored metal strip is coiled to form a coil or transversely cut into a multiplicity of plates by means of a cutting device.

Tailored strips represent a proven technology. Nevertheless, there is an ongoing search for possible ways to further develop this technology so that fewer process steps have to be performed in further processing to finish end products produced from tailored strips. In particular, solutions are being sought which make it possible to produce tailored components made of metal at lower cost.

SUMMARY OF THE INVENTION

The present invention is therefore based on the object of specifying a method and an apparatus of the type mentioned in the introduction which make it possible to produce tailored sheet-metal strips which have to undergo fewer process steps in further processing to finish an end product.

The method according to the invention is characterized in that a web-shaped semifinished product having a three-dimensional structure, a hollow profile and/or a multiplicity of recesses and/or holes in succession along its longitudinal edge is used as the at least one further web-shaped semifinished product which is fed to the joining station.

Since the parts to be connected are fed to the joining process in web form, it is possible to cost-effectively produce a semifinished product (tailored strip) which has to undergo fewer process steps (processing steps) in subsequent further processing to finish a component with a design appropriate for the loading than is the case in semifinished products available to date for producing corresponding components. With the method according to the invention or a correspondingly configured apparatus, it is therefore possible to produce tailored sheet-metal strips, the further processing of which requires fewer process steps, and to this extent is less expensive, to finish a component with a design appropriate for the loading and/or function.

An advantageous configuration of the method according to the invention is characterized in that a web-shaped semifinished product configured in the form of a profile and having a groove or a plurality of grooves running parallel to one another is used as the at least one further web-shaped semifinished product which is fed to the joining station. In this way, it is possible to produce tailored strips which have a relatively high flexural strength, given a relatively low weight, on account of the profiled semifinished product joined in the joining process.

An advantageous development of this method configuration is characterized in that the at least one further web-shaped semifinished product is fed to the joining station in such a way that the at least one groove is covered by the at least one sheet-metal strip and forms a closed hollow profile therewith after the joining.

In a further configuration of this method configuration, it is proposed that the hollow profile is filled or foamed with thermally insulating material after the joining. In this way, it is possible to cost-effectively produce panel-like insulating components, in particular thermally insulating façade cladding panels for buildings and the like.

An advantageous variant of this method configuration provides that the at least one groove is filled or coated with thermally insulating material before the joining. In this way, too, it is possible to cost-effectively produce panel-like insulating components, in particular thermally insulating façade cladding panels for buildings.

A further advantageous configuration of the method according to the invention is characterized in that a web-shaped semifinished product having at least two rows of holes running parallel to one another is used as the at least one further web-shaped semifinished product which is fed to the joining station. In this way, it is possible to cost-effectively produce tailored semifinished products in particular for manufacturing stands and/or brackets, for example for storage racks, or for manufacturing cable ducts (cable chases).

A further advantageous configuration of the method according to the invention provides that a web-shaped semifinished product having a tooth structure defined by successive recesses along its longitudinal edge is used as the at least one further web-shaped semifinished product which is fed to the joining station. In this way, too, it is possible to cost-effectively produce tailored semifinished products for manufacturing stands and/or brackets, for example for storage racks, or for manufacturing cable ducts (cable chases). To this end, the at least one further web-shaped semifinished product is fed to the joining station in such a way that the recesses face toward the at least one sheet-metal strip and define window-like openings therewith after the joining.

A further advantageous configuration of the method according to the invention provides that a web-shaped semifinished product which consists of or is formed from an extruded profile, in particular an extruded hollow profile, is used as the at least one further web-shaped semifinished product which is fed to the joining station. In this case, an extruded profile consisting of relatively soft metal is preferably used as the extruded profile. By way of example, the extruded profile can be produced from copper and/or aluminum or a corresponding metal alloy. In this way, it is possible to cost-effectively produce tailored semifinished products in particular for manufacturing heat sinks, guide rails, seat rails, door sill profiles, window profiles, luminaires, sun protection strips and lamellar walls.

A further advantageous configuration of the method according to the invention provides that the at least one further web-shaped semifinished product is fed to the joining station in such a way that it defines a web protruding from the planar surface of the at least one sheet-metal strip after the joining. In this way, it is possible to cost-effectively produce tailored semifinished products in particular for manufacturing façade panels for buildings and also wall, floor and/or ceiling panels for hollow walls, hollow floors or hollow ceilings of utility vehicles, ships and/or aircraft.

A further advantageous configuration of the method according to the invention provides that a hollow profile which is formed by hydroforming after the joining is formed from the at least one sheet-metal strip and the at least one further web-shaped semifinished product, if appropriate by the addition of at least one further sheet-metal strip having a substantially planar surface and/or at least one further web-shaped, profiled semifinished product. In this way, it is possible to cost-effectively produce tailored hollow components with complex shapes and a low weight, for example chassis parts and/or exhaust pipes for motor vehicles, or corresponding semifinished products for manufacturing such hollow components. By virtue of the hydroforming, it is possible in particular for the wall thickness of the hollow components to be matched to certain points of the respective component as required and to be shaped.

The aforementioned configurations of the method according to the invention also include in particular an embodiment in which the at least one sheet-metal strip having a substantially planar surface and the at least one further web-shaped semifinished product which is integrally connected to the sheet-metal strip along its longitudinal edge differ from one another in terms of their thickness, material quality and/or surface condition.

The apparatus according to the invention is essentially characterized in that at least one processing station configured to profile the further web-shaped semifinished product and/or to cut a multiplicity of successive holes and/or recesses thereinto is arranged upstream of the joining station in the running direction of the web-shaped semifinished product.

An advantageous configuration of the apparatus according to the invention is characterized in that a cutting apparatus for cutting the tailored sheet-metal strip produced to length is arranged downstream of the joining station in the running direction of the web-shaped semifinished product, wherein the cutting apparatus is fitted to a support device, which is movable back and forth in the strip running direction parallel to the tailored strip. This makes it possible to achieve a continuous joining process.

It is preferable that at least one edge machining station configured to machine an edge, to be joined to the at least one sheet-metal strip, of the web-shaped semifinished product by grinding and/or milling is arranged between the processing station which profiles the further web-shaped semifinished product and/or cuts a multiplicity of successive holes and/or recesses thereinto and the joining station.

BRIEF DESCRIPTION OF THE DRAWINGS

The invention will be explained in more detail hereinbelow with reference to a drawing showing a plurality of exemplary embodiments.

DETAILED DESCRIPTION OF THE INVENTION

Figure 1:
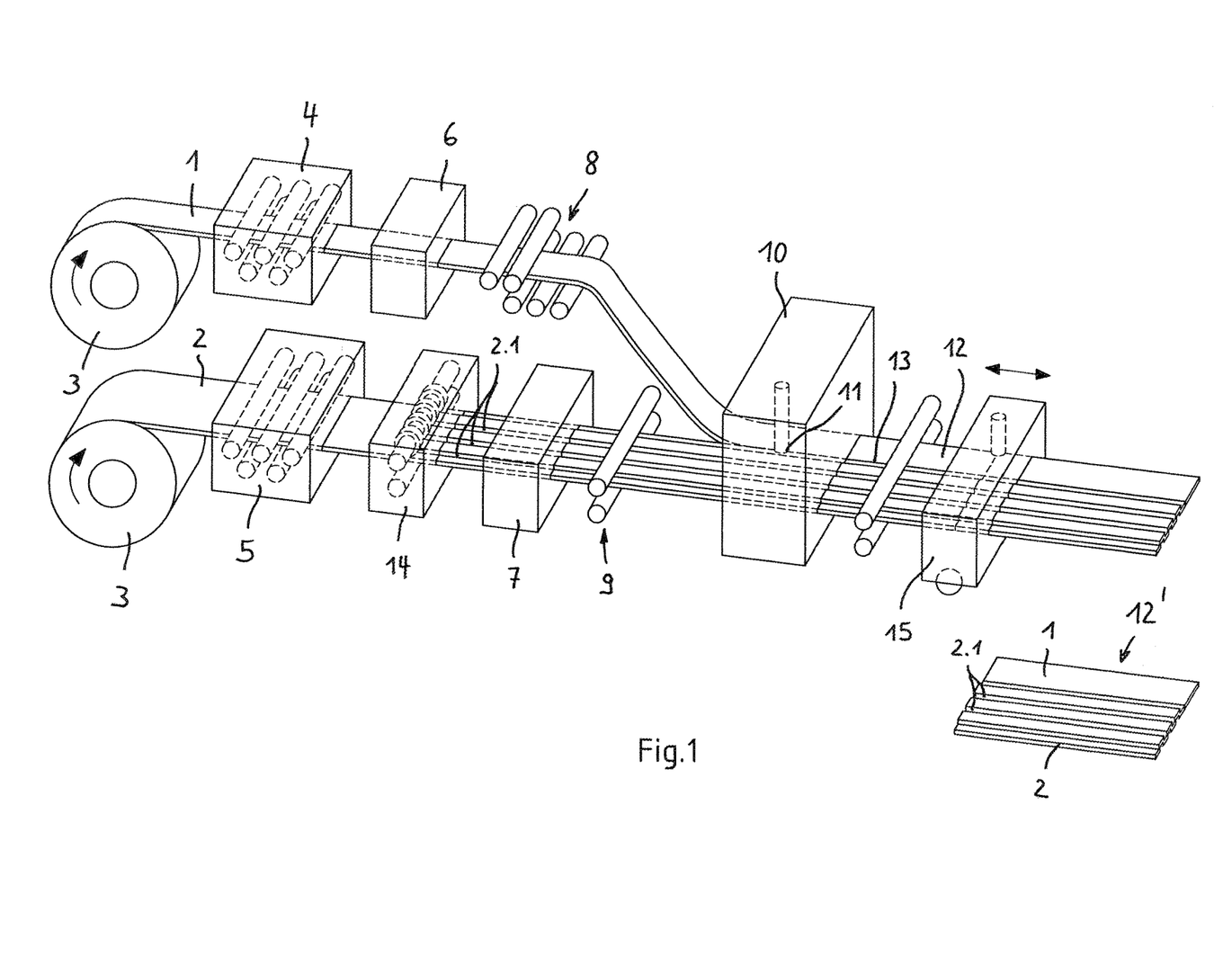
FIGS. 1 and 2 show a first and a second exemplary embodiment of an apparatus according to the invention for producing tailored sheet-metal strips, in each case in a perspective illustration.

FIG. 1 shows a first exemplary embodiment of an apparatus or plant according to the invention for producing tailored sheet-metal strips (tailored strips) 12. At least two slit strips 1, 2 of differing thickness, material quality and/or surface condition are integrally connected, preferably welded, to one another along the longitudinal sides in the apparatus. The slit strips 1, 2 can typically be produced from steel strips of differing thickness and/or material quality. Similarly, however, the tailored strips 12 can also be produced from non-ferrous sheet-metal strips, for example from aluminum and/or magnesium strips of differing qualities and/or thicknesses. Furthermore, the tailored sheet-metal strips 12 can also be formed from a combination of different materials, for example from a combination of steel strip and non-ferrous strip, a combination of aluminum and magnesium, etc. Within the context of the present invention, however, the slit strips 1, 2 to be integrally connected to one another can also be slit strips of identical thickness, material quality and/or surface condition.

The slit strips 1, 2 to be welded to one another are present in the form of coils 3. The individual slit strips or sheet-metal strips 1, 2 are firstly flattened in separate straightening machines 4, 5 after they have been uncoiled from the respective coil 3. After this, or at a downstream station, edge machining is preferably effected, in which at least the edges of the slit strips 1, 2 which are to be joined or are to be welded can be prepared for the subsequent joining process, preferably welding process, by means of milling and/or grinding machines 6, 7.

Separate conveying means (driver units) 8, 9 and strip guiding devices, for example strip guiding rollers, are used to feed the slit strips 1, 2 to one joining apparatus 10 or, in the case of more than two slit strips 1, 2, a correspondingly larger number, reduced in each case by one, of joining apparatuses 10 arranged in succession in the strip running direction, where they are integrally connected, preferably welded, to one another in continuous operation. In this case, the slit strips 1, 2 are usually guided together in such a way that their mutually facing longitudinal edges can be integrally connected to one another with a butt joint. It is also within the scope of the present invention, however, to integrally connect the slit strips 1, 2 or, in the case of more than two slit strips 1, 2, at least two of the slit strips to one another so that they overlap or with a parallel joint, T joint or cross joint.

The slit strips 1, 2 can be connected, in particular welded, to one another continuously. Here, the welding method used is preferably laser welding. Alternatively, however, the welding method employed when carrying out the method according to the invention can also be, for example, high-frequency welding or friction stir welding (FSW).

Friction stir welding is a joining method for light metals. In this joining method, a rotating pin is pressed at great force into the butt joint between two sheet-metal semifinished products or slit strips and moved along the joint line. The workpiece is heated in the region of the joint line and stirred by the rotation of the pin, such that the metal sheets connect. Special preparation of the seam and filler metals are not required here. Since the temperatures which arise during the friction stir welding, in contrast to conventional fusion welding methods, lie below the melting point of light metal alloys, disadvantageous changes in microstructure are avoided. As a result, even higher-strength light metal alloys with little suitability for fusion welding can be welded without filler material (filler wire) and without great losses in strength.

Shielding gas (inert gas), e.g. nitrogen gas, is preferably fed to the working point 11 of the welding or laser beam or friction stir pin, in order to prevent oxidation of the weld seam 13. Furthermore, the at least one weld seam 13 is preferably heat-treated locally by subsequent heating, in order to eliminate or at least reduce possible stress peaks.

As an alternative or in addition to the subsequent seam heating, the tailored sheet-metal strip 12 is temporarily heated over its entire width or over the width of one of its sheet-metal strips (slit strips) 1, 2, in order to homogenize the microstructure of the sheet-metal strip 12. In this context, the sheet-metal strip 12 is heated to a temperature in the range of 200° C. to 500° C. The temporary heating is preferably effected in an inert gas atmosphere.

The strip feeding devices 4, 5, 8, 9 and the at least one joining station 10 define a production line. At least one processing station 14, which forms or profiles at least one of the slit strips (2), is integrated in the production line shown in FIG. 1, whereas the other slit strip 1 or at least one of the slit strips is fed to the joining process as a flattened slit strip which is not spatially formed. The processing station 14 for forming, in particular profiling, the slit strip 2 is preferably arranged between the straightening machine 5 and the edge machining station 7.

The spatial structure which is formed into the web-shaped semifinished product (slit strip) 2 by means of the processing station 14 can comprise a multiplicity of well-shaped depressions and/or at least one groove-like depression 2.1. In the exemplary embodiment shown in FIG. 1, a plurality of groove-like depressions 2.1 are formed into the slit strip 2 by roll forming. After this, the profiled slit strip 2 is fed to the edge machining station 7 and then to the joining station 10.

It is preferable that the tailored sheet-metal strip 12 is coiled to form a coil downstream of the joining station 10. This may also be possible in the case of a tailored sheet-metal strip 12 formed from a profiled metal strip 2, if the profiled metal strip or slit strip 2 consists of relatively soft metal and/or the spatial structure of the formed metal strip 2 has a relatively small characteristic depth.

As an alternative, or if required, however, the tailored sheet-metal strip 12 can also be cut to length to form plates 12' downstream of the joining station 10. The thus obtained plates or panels 12' have a length of, for example, at least 1.5 m, preferably at least 2.5 m and particularly preferably at least 5 m. Relatively long panels 12' of this type can likewise be processed in progressive composite tools given suitable feed or juxtaposition.

In the exemplary embodiment shown in FIG. 1, a cutting apparatus 15 for cutting the tailored sheet-metal strip 12 produced to length is arranged downstream of the joining station 10. The cutting apparatus 15 is in this case fitted to a support device, which is movable, preferably displaceable, back and forth in the strip running direction parallel to the tailored strip 12, such that the continuous joining process in the joining station 10 does not have to be interrupted as the tailored sheet-metal strip 12 is being cut to length. The cutting apparatus 15 is therefore configured in the manner of what is termed a "flying saw".

Figure 2:
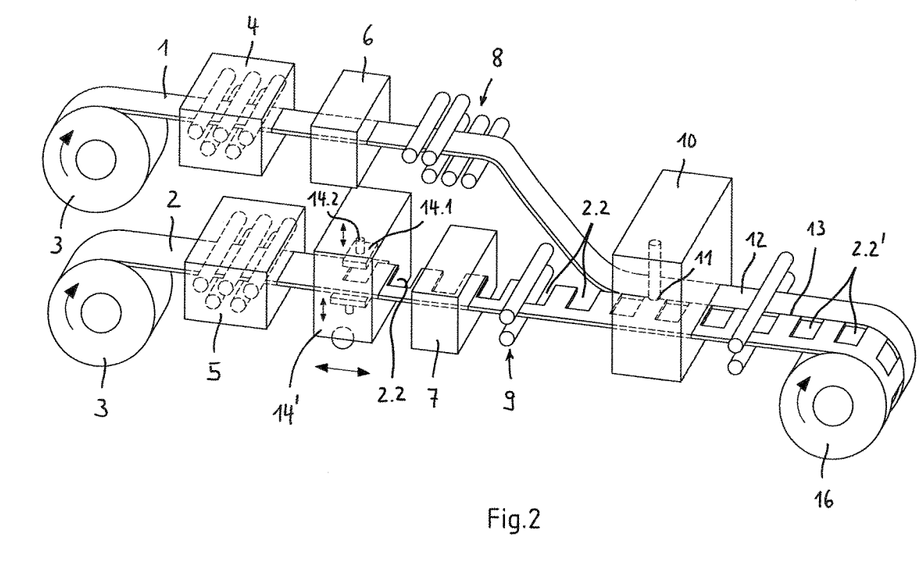

The exemplary embodiment shown in FIG. 2 of an apparatus or plant according to the invention for producing tailored sheet-metal strips 12 differs from the exemplary embodiment shown in FIG. 1 in that a processing station 14' which perforates the slit strip or web-shaped semifinished product 2 and/or provides it with recesses 2.2 in continuous operation is arranged between the straightening machine 5, in which one (2) of the at least two slit strips 1, 2 is flattened, and the edge machining apparatus 7. To this end, the processing station 14' is equipped with at least one hole-punching or cutting tool 14.1. The hole-punching or cutting tool 14.1 can be fitted, for example, to a raisable and lowerable punch 14.2 or to a rotating roller (not shown).

The raisable and lowerable punch 14.2 bearing the hole-punching or cutting tool 14.1 or the rotating roller is moreover preferably fitted to a displaceable support which is movable back and forth parallel to the strip running direction, such that the continuous strip feed and/or the joining process does not have to be interrupted as the holes or the recesses 2.2 are being cut out. Alternatively, upstream and downstream of the processing station 14', as seen in the strip running direction, the web-shaped semifinished product 2 can also be guided into strip loops (not shown), which, as a material buffer, make it possible for the semifinished product 2 moved continuously outside the processing station 14' to be intermittently fed in the region of the hole-punching or cutting tool 14.1.

As shown in FIG. 2, the web-shaped semifinished product or slit strip 2 running into the joining station 10 is cut in such a way that it obtains a tooth structure having successive recesses 2.2 upstream of the joining station 10. Furthermore, FIG. 2 shows that the web-shaped semifinished product 2 is fed to the joining station 10 in such a way that the recesses 2.2 face toward the flattened sheet-metal strip 1 and define window-like openings 2.2' therewith after the joining. The thus produced tailored sheet-metal strip 12 is preferably coiled to form a coil 16 downstream of the joining station.

FIGS. 3 to 10 show various exemplary embodiments of tailored sheet-metal strips 12 produced according to the invention.

Figure 3:
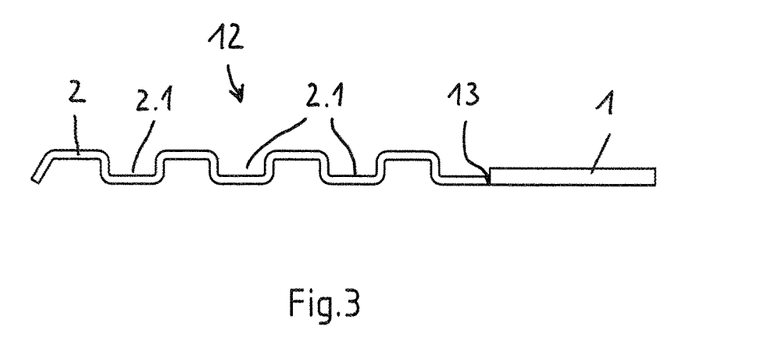
FIG. 3 shows a tailored sheet-metal strip produced according to the invention, in a cross-sectional view.

The tailored sheet-metal strip 12 shown in FIG. 3 has been produced, for example, by means of a plant as shown in FIG. 1. The sheet-metal strip 12 is composed of web-shaped semifinished products or slit strips 1, 2 of differing thickness, which are welded to one another with a butt joint along a longitudinal edge. Whereas the metal strip 1 has a substantially planar surface, a three-dimensional structure in the form of a profile having grooves 2.1 running parallel to one another has been formed into the metal strip 2 before the joining process.

Figure 4:
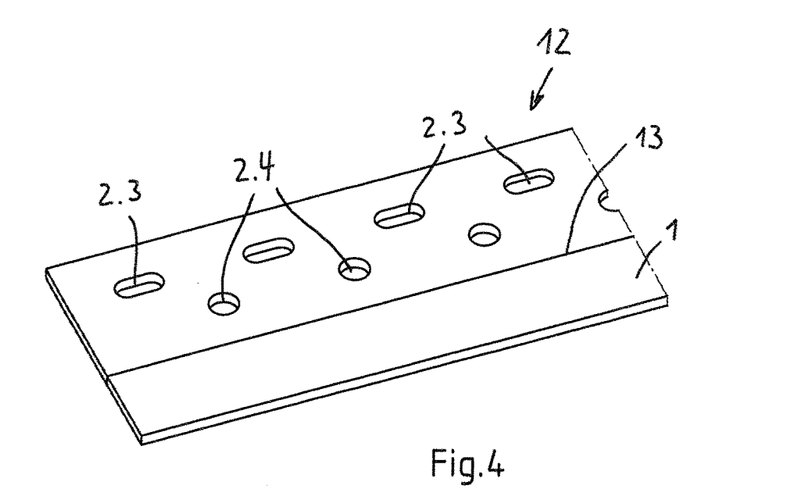
FIGS. 4 to 6 show portions of three further exemplary embodiments of sheet-metal strips produced according to the invention, in each case in a perspective cross-sectional illustration.

The tailored sheet-metal strip 12 shown in FIG. 4 has been produced, for example, by means of a plant as shown in FIG. 2. The sheet-metal strip 12 is composed of web-shaped semifinished products or slit strips 1, 2 of identical or differing thickness, which are welded to one another with a butt joint along a longitudinal edge. Whereas the metal strip 1 has a completely closed, planar surface, the metal strip 2 has been perforated before the joining process. The metal strip 2 and therefore the tailored sheet-metal strip 12 has rows of holes made up of longitudinal holes 2.3 and circular holes 2.4.

Figure 5:
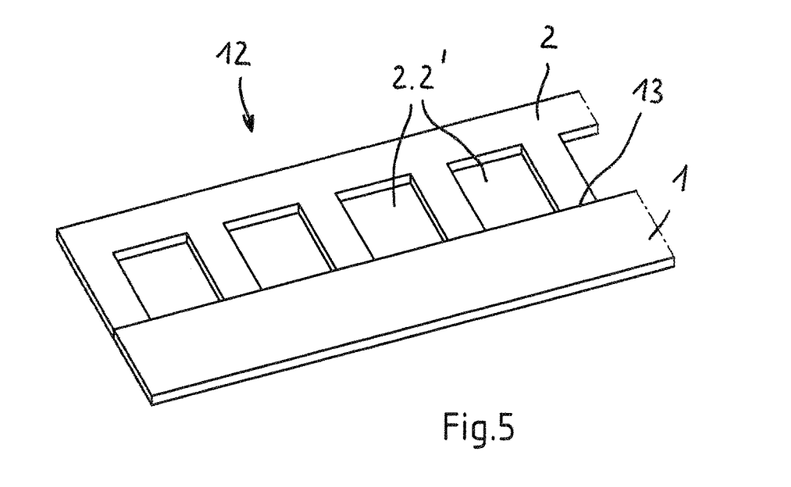

The tailored sheet-metal strip 12 shown in FIG. 5 has likewise been produced by means of a plant as shown in FIG. 2. The web-shaped semifinished products or slit strips 1, 2 are in this case of identical or differing thickness. To produce the weld seam 13 interrupted by the recesses 2.2, the welding beam or laser beam is operated intermittently. In this tailored sheet-metal strip 12, the metal strips 1, 2 are preferably joined by laser welding.

Figure 6:
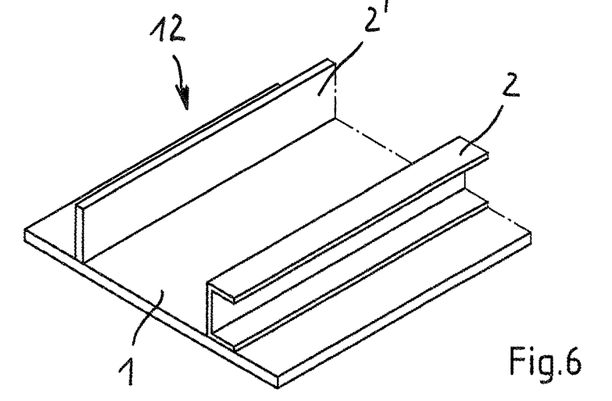
Figure 7:
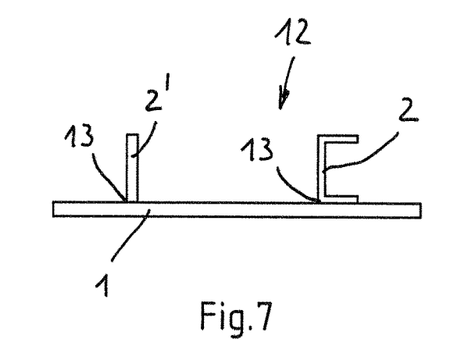
FIG. 7 shows a cross-sectional view of the tailored sheet-metal strip shown in FIG. 6.

The tailored sheet-metal strip 12 shown in FIGS. 6 and 7 can be produced by means of a plant modified with respect to FIG. 1. In this case, a metal strip 1 and further web-shaped semifinished products 2, 2' are integrally connected along their longitudinal edge, wherein at least one (2) of the web-shaped semifinished products (2, 2') is formed into a profile, for example a U-shaped profile, by means of a processing station 14 arranged upstream of the joining station 10 in the strip running direction. Here, the metal strip 1 and the web-shaped semifinished products 2, 2' are of differing thickness and are integrally connected with a T joint or parallel joint.

Figure 8:
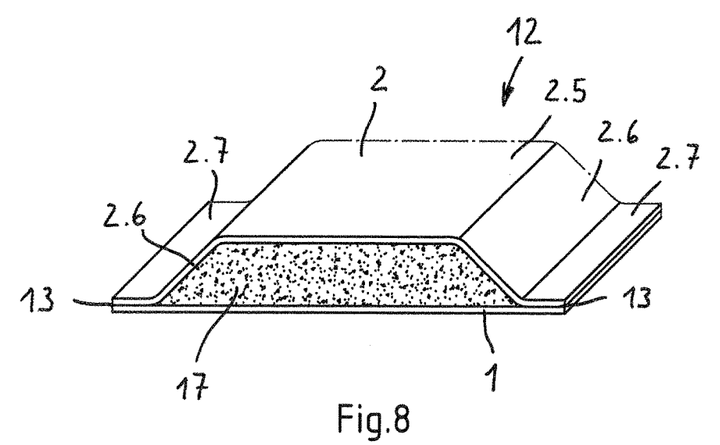
FIGS. 8 to 10 show portions of three further exemplary embodiments of sheet-metal strips produced according to the invention, in each case in a perspective cross-sectional illustration.

The tailored sheet-metal strip 12 shown in FIG. 8 can likewise be produced by means of a plant modified with respect to FIG. 1. To this end, the one metal strip 2 is formed into a groove-like profile by roll forming in the processing station 14 before the joining process. The groove-like profile in this case has a base portion 2.5, adjoining flanks 2.6 and adjoining flanges 2.7. The web-shaped semifinished product 2 in the form of a groove-like profile is then fed to the joining station 10 in such a way that the groove is covered by the flattened sheet-metal strip 1 and forms a closed hollow profile therewith after the joining. Furthermore, the hollow profile can be filled or foamed with thermally insulating material 17 after the joining.

Figure 9:
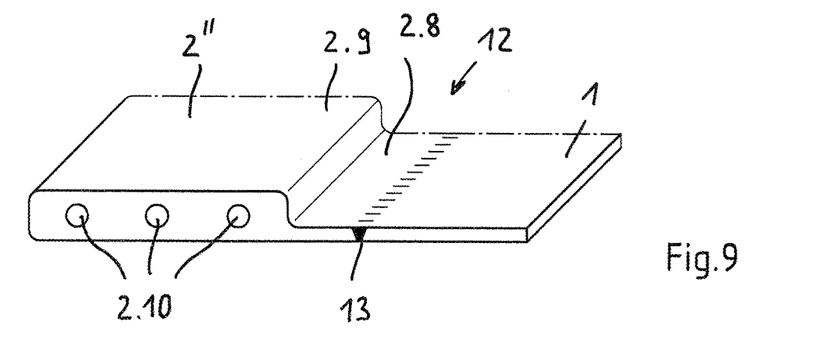

The tailored sheet-metal strip 12 shown in FIG. 9 has been produced from a flattened sheet-metal strip 1 and an extruded profile 2", where the web-shaped semifinished products 1, 2" are welded with a butt joint along their longitudinal edge. The extruded profile 2" preferably consists of a relatively soft metal alloy, for example an aluminum or copper alloy. It has cross-sectional portions 2.8, 2.9 of differing thickness. In this case, one or more hollow channels 2.10, in particular closed hollow channels 2.10, can be formed in the extruded profile 2".

Figure 10:
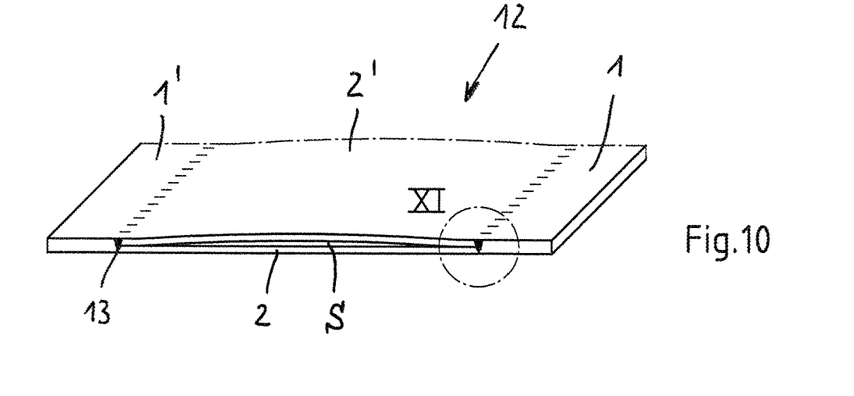
Figure 11:
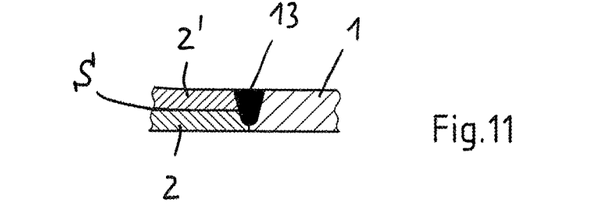
FIG. 11 shows the detail of FIG. 10 in an enlarged cross-sectional view.
Figure 12:
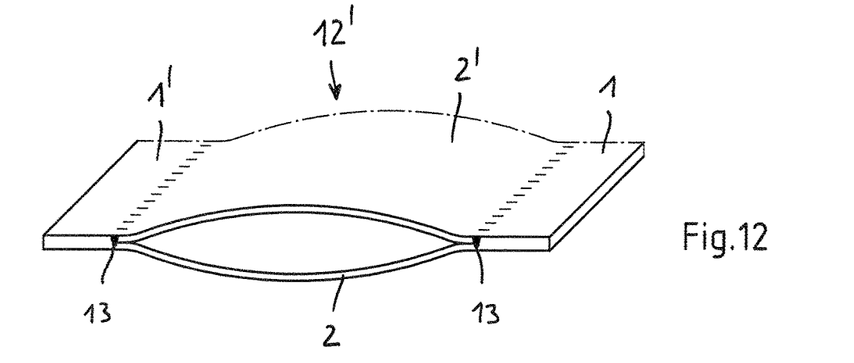
FIG. 12 shows the tailored sheet-metal strip shown in FIG. 10 after hydroforming.

FIGS. 10 to 12 outline a tailored sheet-metal strip 12 which has been composed from web-shaped semifinished products 2, 2' made of metal and flattened metal strips 1, 1', where at least one (2') of the semifinished products (2, 2') is slightly curved as viewed in cross section. The curvature of the at least one web-shaped semifinished product 2' is generated by roll forming with a processing station 14 arranged upstream of the joining station 10 in the strip running direction before the joining process. The web-shaped semifinished products 2, 2' have substantially the same width and thickness. They are placed on one another so that their longitudinal edges can be welded to the outer flattened metal strips 1, 1' with a butt joint 13. The weld seam 13 here connects the two web-shaped semifinished products (metal strips) 2, 2' to the flattened metal strip 1 or 1' joined thereto with a butt joint. The thickness of the flattened metal strip 1, 1' can in this case be approximately twice the thickness of the respective web-shaped semifinished product 2, 2'. Downstream of the joining station 10, the tailored sheet-metal strip 12 as shown in FIG. 10 is cut to length. Then, for each severed sheet-metal strip plate 12', a pressurized fluid is pressed at high pressure into the gap S which is present between the web-shaped semifinished products 2, 2' on account of the curvature, in order to form the tailored strip 12 or plate 12' into a complex shape by hydroforming.

The metal strips 1, 1', 2, 2' of the tailored sheet-metal strips 12 shown in FIGS. 1 to 10 can additionally differ in their material quality and/or surface condition.

The implementation of the present invention is not limited to the exemplary embodiments shown in the drawing. Rather, a multiplicity of variants are conceivable which make use of the invention indicated in the claims even given a configuration which differs from the exemplary embodiments shown. The method according to the invention and the apparatus according to the invention also encompass in particular those embodiments, not shown in the drawing, which can arise by any desired combination of the features indicated in the claims. Thus, it is also within the scope of the invention, for example, to produce a tailored sheet-metal strip 12 from at least one flattened slit strip 1, at least one web-shaped semifinished product 2 provided with a spatial structure (2.1) and at least one web-shaped semifinished product 2 having a multiplicity of recesses 2.2 and/or holes 2.3 and/or 2.4 in succession in the longitudinal direction by means of joining stations 10 in continuous operation. In particular, the processing stations 14 and 14' as shown in FIGS. 1 and 2 can be used in combination in a plant according to the invention.

The invention claimed is:

1. A method for producing tailored sheet-metal strips in a production line, the production line comprising at least one joining station, wherein at least one longitudinal edge of a sheet-metal strip having a substantially planar surface is integrally to at least one longitudinal edge of a further web-shaped semifinished product made of metal, the at least one further web-shaped semifinished product differing from the at least one sheet-metal strip in terms of at least one of its properties, the method comprising:
    feeding the at least one sheet-metal strip and the at least one further web-shaped semifinished product to the at least one joining station;
    joining the at least one longitudinal edge of the sheet-metal strip to the at least one longitudinal edge of the further web-shaped semifinished product; and
    machining the further web-shaped semifinished product to have at least one of a three-dimensional structure, a profile, a multiplicity of recesses and a multiplicity of holes in succession along the least one longitudinal edge of the at least one further web-shaped semifinished product, wherein the at least one further web-shaped semifinished product integrally connected to the at least one longitudinal edge of the at least one sheet-metal strip having the substantially planar surface is formed from an extruded hollow profile.

2. The method as claimed in claim 1, wherein a web-shaped semifinished product having at least two rows of holes running parallel to one another is used as the at least one further web-shaped semifinished product which is fed to the joining station.

3. The method as claimed in claim 1, wherein the at least one further web-shaped semifinished product is fed to the joining station in such a way that it defines a web protruding from the planar surface of the at least one sheet-metal strip after the joining.

4. The method as claimed in claim 1, wherein the at least one sheet-metal strip having a substantially planar surface and the at least one further web-shaped semifinished product which is integrally connected to the sheet-metal strip along its longitudinal edge differ in terms of at least one of their thickness, material quality and surface condition.

5. The method as claimed in claim 1, wherein an edge, to be joined to the at least one sheet-metal strip, of the at least one further web-shaped semifinished product is machined by at least one of grinding and milling before the joining.

* * * * *